(12) United States Patent
Nazhad (10) Patent No.: US 8,869,420 B1
(45) Date of Patent: Oct. 28, 2014

(54) ENERGY-EFFICIENT PROCESS AND APPARATUS FOR DRYING FEEDSTOCK

(71) Applicant: Mousa Mohammad Nazhad, Vancouver (CA)

(72) Inventor: Mousa Mohammad Nazhad, Vancouver (CA)

( * ) Notice: Subject to any disclaimer, the term of this patent is extended or adjusted under 35 U.S.C. 154(b) by 0 days.

(21) Appl. No.: 13/732,437

(22) Filed: Jan. 2, 2013

Related U.S. Application Data (60) Provisional application No. 61/796,747, filed on Nov. 19, 2012.

(51) Int. Cl.
F26B 3/02 (2006.01)
F26B 21/08 (2006.01)

(52) U.S. Cl.
CPC ..................... F26B 21/08 (2013.01)
USPC .................. 34/334; 34/377; 34/132; 34/141; 110/342; 210/774; 201/32; 202/108

(58) Field of Classification Search
USPC ............... 34/334, 377, 380, 381, 79, 80, 132, 34/136, 141, 167; 110/342; 210/774; 201/5, 15, 32; 202/106, 108
See application file for complete search history.

(56) References Cited

U.S. PATENT DOCUMENTS

| | | | | |
|---|---|---|---|---|
| 3,400,465 A | * | 9/1968 | Von Stroh | 34/443 |
| 4,169,321 A | * | 10/1979 | Nichols | 34/461 |
| 4,567,674 A | * | 2/1986 | Strohmeyer, Jr. | 34/591 |
| 5,361,514 A | * | 11/1994 | Lahoda et al. | 34/391 |
| 5,842,289 A | * | 12/1998 | Chandran et al. | 34/579 |
| 5,915,815 A | * | 6/1999 | Moore et al. | 34/305 |
| 8,117,764 B2 | * | 2/2012 | Ness et al. | 34/381 |
| 8,161,661 B2 | * | 4/2012 | Bartol | 34/86 |
| 8,726,532 B2 | * | 5/2014 | Hogan | 34/141 |
| 2003/0024686 A1 | * | 2/2003 | Ouellette | 165/47 |
| 2005/0000108 A1 | * | 1/2005 | Ragnarsson | 34/92 |
| 2005/0050759 A1 | * | 3/2005 | Chandran et al. | 34/576 |
| 2008/0229610 A1 | * | 9/2008 | Ronning | 34/514 |
| 2008/0309087 A1 | * | 12/2008 | Evulet et al. | 290/52 |
| 2009/0165326 A1 | * | 7/2009 | Hedberg et al. | 34/312 |
| 2011/0214309 A1 | * | 9/2011 | Ness et al. | 34/526 |
| 2012/0304488 A1 | * | 12/2012 | Pardo | 34/514 |
| 2013/0000532 A1 | * | 1/2013 | Rabiner | 110/346 |
| 2013/0125412 A1 | * | 5/2013 | Haarlemmer | 34/477 |
| 2013/0167394 A1 | * | 7/2013 | Zhong et al. | 34/79 |
| 2014/0007447 A1 | * | 1/2014 | Qian | 34/86 |
| 2014/0150287 A1 | * | 6/2014 | Ahn et al. | 34/474 |

FOREIGN PATENT DOCUMENTS

| | | | | |
|---|---|---|---|---|
| DE | 19722109 A1 | * | 12/1997 | |
| GB | 1366854 A | * | 9/1974 | |
| JP | 10054520 A | * | 2/1998 | F23G 5/04 |
| WO | WO 2010053278 A2 | * | 5/2010 | F28D 7/08 |

* cited by examiner

Primary Examiner — Steve M Gravini (57) ABSTRACT

This invention presents a versatile and continuous drying technology that utilizes controlled heat combined with forced air supply for drying a feedstock. The dryer virtually divided top-down into different zones, each having definite heated air distribution rate to secure desired condition for drying of the feedstock. The heat source of the dryer is waste heat, either provided by the feedstock itself through exothermic heat generated by the feedstock or reclaimed waste heat or solar heat. The discharge system of the dryer is a fail-safe discharge system, which ensures equal residence time for the feedstock through all the zones. The synergic interaction of all these components along with recycling the heat through an efficient use of heat exchangers, optimized control of airflow rate and feedstock resident time, purifying the exhaust air and condensing the outlet vapor empowers the technology to function with minimum energy, minimum processing time, minimum environmental foot-print, minimum cost and with minimum operational cost.

17 Claims, 11 Drawing Sheets

ENERGY-EFFICIENT PROCESS AND APPARATUS FOR DRYING FEEDSTOCK

REFERENCE TO RELATED APPLICATIONS

This application is continuation of U.S. patent application Ser. No. 13/732, 437 entitled "Energy-efficient process and apparatus for drying feedstock" filed Jan. 2, 2013, and claims priority to Provisional Application No. 61/581,621 entitled "Energy-efficient process and apparatus for drying feedstock" filed Dec. 29, 2011; U.S. Provisional Application No. 61/796,747 entitled "Embodiments of devices, methods, systems and apparatus for the efficient processing of feedstock into fuel and other materials having desirable moisture contents" filed Nov. 19, 2012, and U.S. Provisional Application No. 61/891,392 entitled "Novel method and a novel apparatus for a cost-effective drying of feedstock with environmentally sound means" filed Oct. 15, 2013, which all three are specifically and entirely incorporated by reference.

FIELD OF THE INVENTION

This invention presents a new cost-effective and efficient methods, devices and apparatus for drying feedstock of various origins (municipal, industrial and agricultural). In particular, the present technology provides a new drying apparatus, as well as related methods, devices and systems, wherein the feedstock is dried up to over 85% dry mass content from dry mass content of 10-40% by captured heat from waste heat sources in synergy with a network of forced airflows and recycled heat sources.

BACKGROUND OF THE INVENTION

Prior arts apparatus and methods have addressed the need for drying feedstock with emphasis on drying municipal solid waste for energy conversion. Economic utilization of the waste with ecologically balanced solution is yet to be found.

Mechanical and biological treatment (MBT) process is a well established process for municipal solid waste (MSW) treatment in Europe, but its environmental footprint and economical viability pose serious questions. This is so, due to the fact that the process feed is a mixed waste (bulk collected waste) with high loads of heavy metals and persistent organic pollutants. To strip the contaminants from the recyclables or the organic fraction, if not an impossible task, it is an extremely costly one. For these reasons as well as environmental guidelines, the end users are reluctant to use MBT products.

A by-product of waste water treatment is a solid waste referred to as sludge, which accounts for over 40% of waste water stream. The common practice for treatment of sludge is composting with maturing time of over 50 days, which is not a practical technology for large quantities of sludge. The caloric value of the compost is also very low due to complete mineralization of the waste. Instead, a low grade heat process along with technology such as exothermic heat generated by microorganisms are capable of removing water at the lowest possible residence time and minimal biodegradation, hence preserving maximum caloric value of the waste. Prior art devices and methods have prioritized drying of waste compared to composting. It has been suggested that composting for the most part has significant uncertainties, and it is a non-uniform process (U.S. Pat. Nos. 3,419,377; 4,956,002; and 5,688,686).

Drying waste with maximum efficiency and minimum environmental impact requires a heat source on the order of 100° C. or less. This energy could be harvested from the exhausts of turbines or from condensers on a steam topping cycle. To be able to harness heat from these waste sources, a dryer with a specific design is required. Dryers such as bed dryers or drum dryers require a temperature in the range of 200° C. to 350° C. Use of such levels of heat reduces caloric value of the waste, due to partial combustion of the feedstock. Adjusting the driers to work at a temperature less than 100° C. requires a drastic change in the design and structure of the prior arts. Having a dryer to utilize these heat sources reduces or eliminates the use of fossil fuels in the process, which ultimately reduces the drying cost and establishes better environmental records.

Up to now, the art focus has been to increase the efficiency of low-grade heat, so that a maximum amount of useful work can be achieved from vapor cycle engines (U.S. Pat. No. 3,950,949 A; U.S. Pat. No. 6,333,445 B1; U.S. Pat. No. 6,763, 680 B2; U.S. Pat. No. 7,278,264 B2, etc.). These procedures describe a method which enhances the efficiency of the vapor cycle engines using low-grade heat sources. The efficiency of engines using low-grade heat is normally half that of engines run by primary fuel sources. Using heat exchangers may help to overcome this problem, but it adds to the energy and capital cost. So, although the efficiency of low-grade heat at or below 85° C. for the production of power is too low, it is suitable for the drying of feedstock specifically if it is used with a technology that guarantees the continuity of the heating source. Employing low-grade heat at less than 100° C. could preserve the caloric value of feed stock. U.S. Pat. No. 4,888,885, U.S. Pat. No. 6,163,981 and U.S. Pat. No. 6,742,284, B2 disclose technologies using low-grade heat sources for drying feedstock. These dryers are indeed modified versions of bed or rotary drum dryers which are using low grade heat. The major drawback of these dryers is their inadequate air distribution system, where moist air condenses on the feedstock as it finds its way out.

Biological action in feedstock, in a given condition, generates heat, which can be harvested similar to low-grade heat process. A number of attempts have been made to use this energy for the production of combustible solid fuel from organic waste (U.S. Pat. No. 8,124,401 B2, U.S. Pat. No. 7,960,165 B2, U.S. Pat. No. 7,662,205 B2, U.S. Pat. No. 7,744,671 B1, U.S. Pat. No. 4,837,153, EP 2000449 A1). The prior art discloses methods and techniques using exothermic heat for composting or drying of microorganism-rich feedstock from 65% moisture content to less than 30% in a period of 3-20 days. U.S. Pat. No. 8,124,401 B2 is capable of producing biofertilizer from sludge through harvesting the heat from the bioreactor to feed in a drying unit with assist of forced airflow system. Although the system adequately dries the sludge it exhibits serious disadvantageous. Drying uniformity has a direct influence on drying efficiency. The airflow system in the prior arts introduces air in only one direction. The airflow in the drying chamber in the process of passing through the sludge cools off, causing non-uniform drying of the sludge. Reversal of airflow direction results in the drying uniformity, as well as a reduction in drying time. U.S. Pat. No. 7,960,165 B2 is also suffering from the same drawbacks. Most importantly, the latter prior arts' process (U.S. Pat. No. 8,124,401 B2, U.S. Pat. No. 7,960,165 B2) require costly process equipment and an elevated operational cost. Although European patent (EP 2000449 A1) aerates waste alternatively from above and below the dryer cells which promotes drying uniformity, the drying process is yet inefficient due to the fact that the air condenses if the travelling distance of hot air in a moist environment exceeds 1.5 meters. This finding has been estimated through thermodynamic calculations and tested in the process of ongoing work. The airflow restriction as such translates itself into a shorter drying period of cells in a vertical direction, consequently larger space requirement in the transverse direction. The prior arts are also extremely inefficient due to the fact that the parameters to control the energy have not been well explored.

The forthcoming findings in the course of this invention well justify the preceding statement. The main controlling variable for the dryer is the outlet relative humidity. Controlling the drying process using the outlet relative humidity may be explained by the following example: Set the outlet relative humidity of each zone at a specific number, say at 95%. Once the outlet relative humidity exceeds this number in one or several zones, the automation system sends a message to the control room that the drying gas (air, CO2 or the like) flow rate should be increased, thus increasing the efficiency of the gas flow rate. This is the response of the dryer at the beginning of the drying procedure, where the feedstock is rich in free water. Towards the end of the drying process, the moisture source in the feedstock at the drying apparatus is the water generated through diffusion. The diffusion process is slow, so the outlet relative humidity will drop below the set point. To remove the moisture efficiently, the gas flow rate should be reduced. This also minimizes fine dried particles to be carried over by exhaust gases. These controls bring about substantial savings in energy.

Although the earlier arts in the field benefitted from using heat exchangers in the feedstock drying process (U.S. Pat. No. 8,124,401 B2, U.S. Pat. No. 7,960,165 B2) the proposed systems of using heat exchangers are relatively inefficient since the fact that the heat source to be recovered by heat exchangers is very low was left unnoticed. For instance, the heat generated by exothermic reactions is about 65° C. Recovering heat at such a range is very inefficient and demands an extensive surface area—recalling the fact that heat transfer to an object is a function of surface area. Therefore, heat loss or space requirement would be a critical issue in developing an energy-efficient drying technology.

The prior arts on drying are not configurable to different heat sources or different feedstocks. The importance of this invention also lies in its versatility concerning heat sources or feedstock diversity. The dryer works with all sorts of energy sources, such as low grade heat, solar heat, heat produced from exothermic reactions (self-heating) or heat generated from primary sources such as electricity or gas. Other examples of heat sources include but are not limited to unfocused solar energy, geothermal energy, ocean temperature gradients, process waste heat, exothermic biological heat, and heat harvested from incinerator or boiler exhaust.

A further addition to the prior arts is that the dryer in one embodiment may be used as a composter by varying the airflow rate to the zones, as well as recycling a portion of the exhaust gas in each zone to the inlet line of that zone which can be appreciated by one who is skilled in the art. This versatility of the present invention is valuable where prior arts were either in the form of a dryer or a composter per se. The composter—by benefiting from the features of the dryer that is automatically controlling and recycling airflow system, preserving moisture of the feedstock in different zones at optimum level and adjusting the heat of each zone through the heat exchangers system of the dryer—increases composting efficiency and also reduces residence time of the feedstock. These processes not only reduce energy costs, but also contribute in eliminating harmful gases. Uniform distribution of heat or airflow system prevents creation of compost pile hot spots or dead spots and thus guarantees that the end product of the process meets the required environmental standards.

Another benefit when compared with the prior arts is that this invention could also dry organic and inorganic components of the waste in a single run. In the absence of any source of low grade heat, the heat generated in the drying process of organic waste can be used also to dry the inorganic fraction of waste.

The invention proposed herewith is a vertical oriented dryer chamber perpendicular to its length with embodiments specific to feedstock as well as energy source. The feedstock continuously or in a connected series enters from the top zone and moves downwardly by gravity force, thus in general eliminating any need for an extra device for transporting the feedstock to the lower end. A custom-designed discharge system assists the uniform discharge of the dried feedstock from the opening at the lower end. This is another important addition to the prior art, where the discharge system contributes to the uniformity of drying through uniform discharging of the feedstock. The vertical oriented structure of the drying chamber along with its uniform forced air distribution—recycling efficiently recovered heat by the heat exchangers system embedded in the body of the drying chamber and uniform feedstock discharge—preclude the generation of hot spots and guarantee the feedstock's uniform drying. Recycling the recovered heat through the heat exchangers system reduces the residence time of a feedstock in the drying chamber and contributes to the reduction of harmful gases such as volatile organic compounds and the waste odor in the procedure. In addition, the dryer leaves a very small environmental footprint, since the filtration system treats discharged gases for hazardous emissions before sending it back to the dryer—which is equipped with a biofilter capable of trapping and neutralizing particulates and hazardous gases.

OBJECTS OF THE INVENTION

Currently cities produce thousand tons of waste every single day. The disposal of these waste materials in economical way and environmentally friendly manner is the major challenge of our age. The present invention in a broader sense introduces a novel method and a novel apparatus for a cost-effective drying of city waste with environmentally sound means to be used in boilers or gasifiers for energy production.

Another object of the invention is to provide a simple dryer to dry biomass and wastes such as but not limited to industrial sludge, pulp and paper sludge, city sludge, animal residuals, excrement and like from dry mass content of as low as 20% up to a dry mass content of 80% or over to be used as added value biosolid for energy conversion. The final dry matter content depends to the application. For instance, for a gasification system, thermal efficiency deteriorates if dry matter content is below 80% whereas for fluidized bed co-gen plants 50% dry matters content may be sufficient to provide an auto-thermal nature in the co-gen plants and stabilize the combustion process.

In a wide variety of industries, the raw material must be dried before experiencing further treatment. These industries including, but not limited to the lumber industry, food industry, pulp and paper industry. Another object of the invention is to dry these raw materials to a desired level of the industry. For example, composition boards, such as particle board, chipboard, and medium density fiberboard (MDF) require moisture content as low as 10%.

Another object of the invention is to provide a process and apparatus for drying agricultural crop materials such as fruits, grains, vegetables, etc. in a controlled temperature and airflow rate with a minimum energy cost and preserved properties.

Another object of the invention is to introduce a multipurpose technology, where it could also be used as an accelerated composter with lower environmental 'foot print' by lowering the airflow rate and recycling back the air to the dryer.

Other objects and special features of the invention are to introduce a dryer/composter which is portable, odorless, and cost competitive with minimum space requirement in the process.

SUMMARY OF THE INVENTION

The present invention provides a method and apparatus for more efficiently and economically drying of a feedstock. Unlike the prior arts, the present invention uses a dryer with upright enclosure of generally rectangular cross section perpendicular to its length with openings disposed at the top and bottom of the drying chamber. The top end opening disposed for accepting the wet feedstock and the bottom end opening disposed for discharging the dried feedstock. The interior walls of the drying chamber are designed friction free to assist free move of the feedstock from the upper end to the lower end. The exterior of the drying chamber are made from well-insulated materials by known means in the art to prevent condensation of water. The feedstock is supplied to the drying chamber by known means in the art such as but not limited to feed screw, belt conveyor, or forklift truck. The dried feedstock discharged by a roller type parallel screws specially designed to assist drying uniformity and extraction of dried material from the dryer. The feedstock moves down from upper end of the vertical drying chamber to the lower end mainly due to the force of gravity. The apparatus further comprising a plurality of zones forming a vertical stack between the upper and the lower ends, wherein each zone comprises an upper margin and a lower margin. The plurality of zones are arranged vertically one over another to form a vertical oriented stack-like drying chamber. Each zone comprises at least one input perforated plate arranged between the upper and lower margins for transmitting input gases into the zone, and at least one output perforated plate positioned between the upper and lower margins and configured for transmitting output gases out of the zone. The perforated plates are arranged at a distance from one another such that the input gases are transmitted substantially crosswise through the zone and through the feedstock resident in the zone, and out through at least a second perforated plate. The output gases form an exit gas stream at the passage out through at least a second perforated plate of each zone. The input gas is supplied to the dryer chamber by a positive blower after passing a dehumidifier and at least a heat exchanger. The output gas is connected to the plurality of heat exchangers installed along the walls of the stack-like drying chamber for recycling heat back to the dryer through a negative blower after performing the necessary treatments for hazardous gases. The biofilter precludes hazardous gas emissions to environment. This is in addition to the self-biofiltering of the drying system, which takes place through recycling of the output gas. The output gas before reaching the negative blower is also treated for moisture through condenser. The collected water is benign and can be utilized directly for agricultural purposes or as cooling source for other process units. It could also be further stripped from unwanted components using moisture resistant biofilter designed for the dryer.

The dryer based on programmed residence time can automatically reverse airflow stream within the feedstock pile with a defined airflow path to prevent drying non-uniformity, consequently reducing drying time.

The outlet relative humidity is used for controlling gas flow rate. Once the outlet relative humidity exceeds the set point in the control panel of the system (most likely at the top zones of the drying chamber), the control system automatically adjusts the flow rate. In the same way, when the outlet relative humidity drops below the set point, the control system automatically adjusts the air flow rate in that particular zone (s). These controls bring about substantial savings in energy.

If the heat source of the dryer is an exothermic heat generated by microbial reactions, then the incoming feedstock from the upper end is mixed with a portion of the discharge in a ratio of 0-30% w/w before entering into the drying chamber. The mixing of incoming fresh feed with some of the dryer discharge is for the control of moisture required for microbial growth and drying uniformity.

If the heat source is external, then the discharge of the lowest zone of the drying chamber could be fully returned to the first zone at the upper end of the drying chamber without mixing with any fresh feedstock. Discharging the feedstock of the last zone causes each feedstock of the upper zones to move one level down, suggesting recirculation of the feedstock in succession until it reaches a desired level of dryness. This process is also referred as batch drying.

The modular structure of the present invention allows it to efficiently handle the waste of a small community as well as a mega city through combination of the stack-like vertical dryers in series. If we take on a project, a single demo, where the continuous dryer unit is (0.5-1)m×(1-2)m×3m (width×length×height), its production rate will be 1-5 tons/day. By comparison, the larger scale module-based dryer is 1m×12m×(4-6) m (width×length×height) has a production capacity of over 10-40 tons/day. A city with waste production rate of 120 tons/day should assemble a required number of dryer modules with airflow directed through a gas inlet plenum disposed parallel to the air inlet housing assemblage, and then to each of the stack-like drying chambers. Accordingly, the exhaust air from each stack-like drying chamber to an exhaust plenum disposed parallel at the air outlet side of the housing assemblage.

BRIEF DESCRIPTION OF THE DRAWINGS

Features and embodiments of the invention will become more apparent to those skilled in the art with the following detailed descriptions of the drawings and embodiments:

FIG. 1.1 shows a two-dimensional sketch of an upright rectangular drying chamber perpendicular to its length with plurality of inlet gas ports ($I_1$-$I_n$) and outlet gas ports ($O_1$-$O_n$).

FIG. 1.2 shows a vertical stack-like dryer chamber filled with feedstock (open circles) and bulking material (filled circles).

FIG. 1.3 shows 3D structure of the vertical oriented drying chamber including one gas inlet port and one gas outlet port.

FIG. 1.4 shows 3D structure of a vertical dryer with plurality of gas inlet-outlet ports along with one heat exchanger in the gas inlet port and one heat exchanger in the exhaust outlet port.

FIG. 6.1 shows an apparatus for storing solar heat to be used overnight.

THE FOLLOWING NON-LIMITING SET UP AND CONFIGURATIONS ILLUSTRATE THE FUNCTION AND STRUCTURE OF THE CURRENT INVENTION

FIGS. 1-8 provide a method and apparatus for drying feedstock, described in further detail below.

Figure 1:
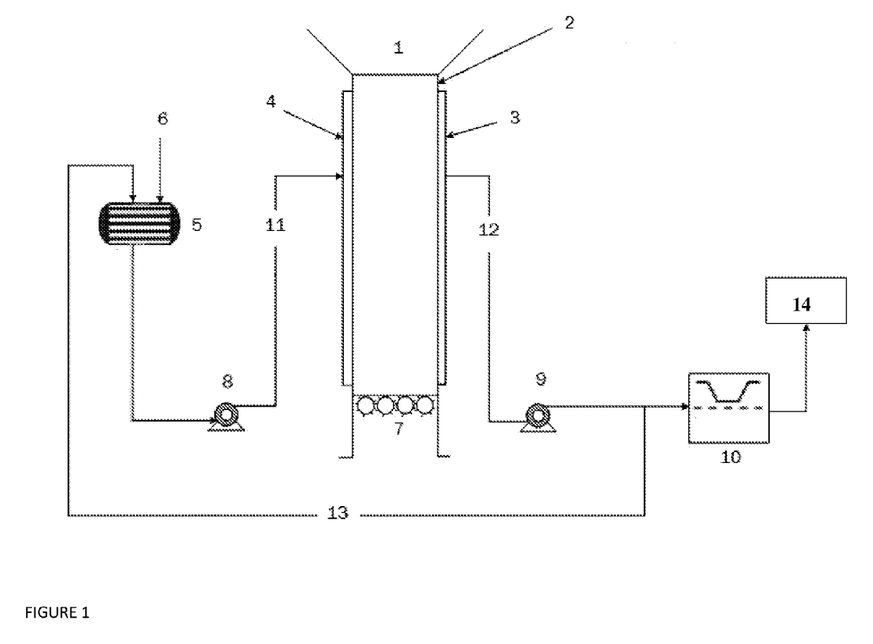
FIG. 1 is a schematic drawing of the drying apparatus without reference to a specific feedstock or energy source.

With respect to FIG. 1, feedstock (not shown) enters through a feeding port 1 to the dryer chamber 2. Fresh air is provided primarily by means of positive blower 8 which is operatively connected to Port 4. In one embodiment, the air 6 is drawn through dehumidifier 5 and heat exchanger (not shown) into inlet air port 4. Depending on the heat source, the configuration of the drying apparatus could vary. FIG. 1.1 shows the drying chamber consisting of the plurality of inlet gas ports ($I_1$-$I_n$) and plurality of outlet gas ports ($O_1$-$O_n$). In a preferred embodiment, the drying chamber is oriented perpendicular to its length with rectangular cross-section. The virtual zones are varied based on feedstock characteristics and heat source. FIG. 1.2 shows in detail the content of the feedstock in a drying chamber consisting of 5 zones. The drying chamber is filled with feedstock (open circles) 1, and bulking agent (filled circles) 2. The feedstock at zone 5 discharges through discharge 7. The dryer equipped with plurality of inlet gas ports 3, perforated plates 4 and plurality of outlet ports 5. FIG. 1.3 shows a 3D view of the dryer chamber with inlet gas port 1 along with outlet exhaust gas port 2 and perforated plate 3. FIG. 1.4 shows 3D view of the drying chamber 8 with plurality of perforated plates 9 along with a heat exchanger 10 at inlet port 6 and a heat exchanger 11 at the exhaust port 7. The drying chamber 8 shows five virtual drying zones (zones 1-5). Outlet air port 3 (discharge air) is provided opposite to inlet port 4 on the drying chamber to collect air from the chamber assisted by negative blower 9. The dried feedstock discharges through a discharger port 7.

The exhaust air pumped out through negative blower 9 after passing through an air filter (not shown) and a condenser (not shown), then a biofilter 10. Then, the dry air recycled back to the drying chamber through inlet port 4 for heating the fresh feedstock. The discharge air without treatment may be re-circulated through the system for reduction of harmful gases. The buildup of carbon dioxide will be reduced by purging the outlet air and using fresh make-up air as replacement. The exhaust air after thorough treatment may be vented via 14.

Figure 2:
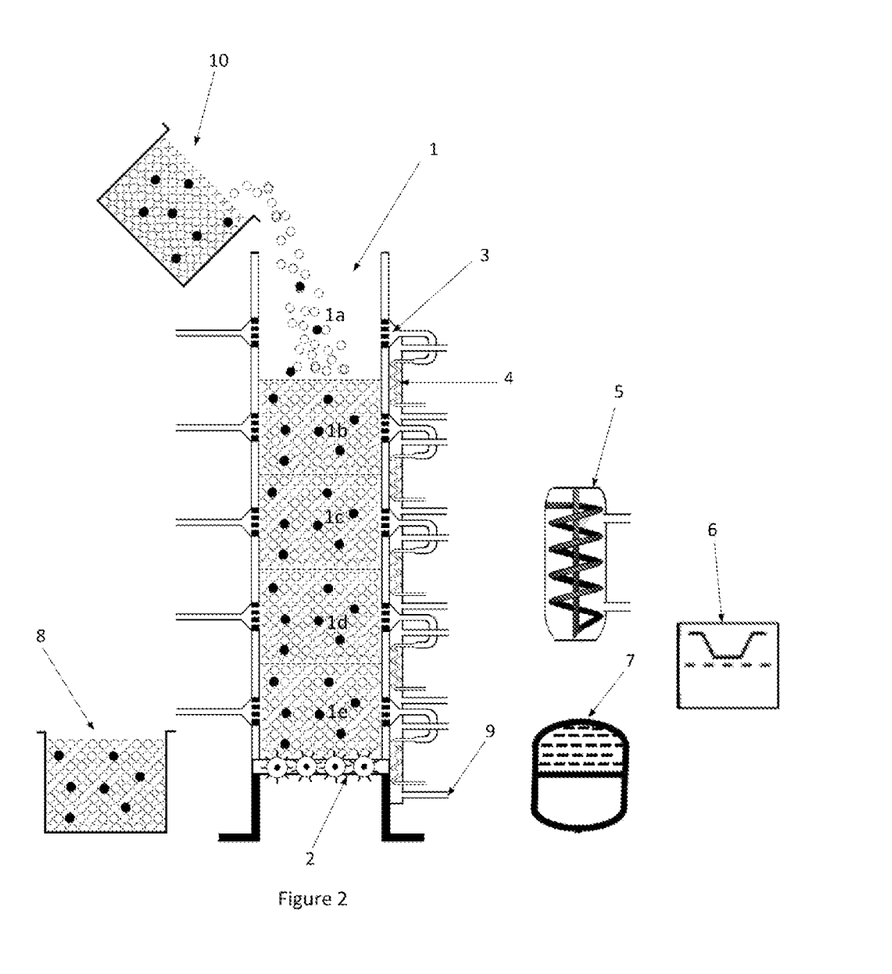
FIG. 2 shows an embodiment of the drying apparatus where feedstock is biosolid including microorganisms population.

If feedstock 10 is a biosolid with potential microorganisms, then the heat source of the dryer would be exothermic biological heat originated from bio-chemical activities of microorganisms (See FIG. 2). The feedstock 10 moves down in the drying chamber in a continuous manner from first zone 1a to the second zone 1b where mesophilic bioheat contributes to evaporation of surface water, followed by third zone 1c, and then fourth and fifth zone, 1d and 1e, the thermophilic dominated zones. At this stage the temperature reaches to 55-65° C., removing some of the bound water, thus reducing the moisture content of the feedstock to about 45% or lower depending on the residence time. Part of the partially dried feedstock 8 re-circulates in the vertical stack 1 at a given time interval as shown in FIG. 2 to guarantee its dryness uniformity. The feedstock 8 at this stage leaves the vertical chamber 1 at the end of zone 1e through discharge port 2. Outlet hot moist air of 1e zone passes through heat exchanger 4 to recover heat 9 to be sent to one or several zones of the vertical stack 1 through inlet ports (outlet port 9 is shown here). The heat exchangers set up at the inlet ports are not shown. The exhaust air 3 is then condensed 5 and filtered 6. The dry air is either recirculated to the system or vented depending on its quality. The condensate is used for irrigation.

Figure 3:
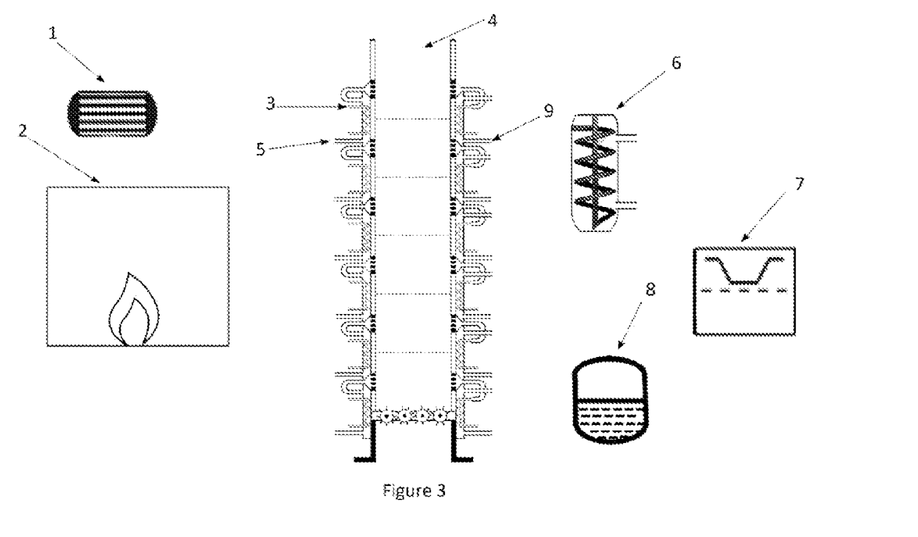
FIG. 3 shows an embodiment of the drying apparatus where the heat source is low grade heat.
Figure 4:
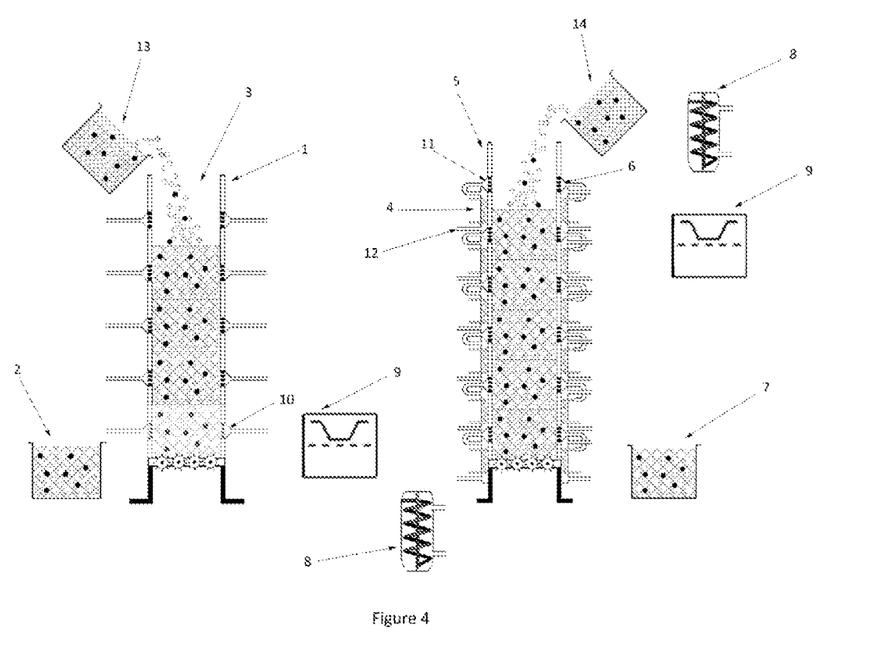
FIG. 4 is a schematic representation of the drying apparatus for drying bio-degradable and non-biodegradable parts of feedstock in one embodiment of the invention. The figure demonstrates how the heat generated at thermophilic bacteria could be harvested with assistance of heat exchangers and used for drying the non-biodegradable portion of the waste as well.

In one embodiment the heat source is a waste heat received from a boiler 2 (FIG. 3). The feedstock dries through heated air generated by a heat exchanger 3 after passing through the dehumidifier 1. The heated air enters the drying chamber 4 through the inlet ports (inlet port 5 is shown here). The exhaust air (exhaust air 9 is shown here) condensed 6, then filtered 7. The dry air may be recycled back into the vertical stack or vented depending on its quality.

Where the feedstock is a mixture of organic and non-organic solids such as city waste, then the organic waste will be treated using the heat generated by bio-chemical activities of microorganisms (See FIG. 4). The organic solid portion 13 is fed to the drying chamber 1, and non-organic portion 14 is fed into the drying chamber 5 next to the first one. As presented in FIG. 4, the wet organic solid 13 enters the drying chamber 1 at moisture content of about 65-70% through solid feeding inlet port 3 into the drying chamber 1 (first zone). The thermophilic zones near the bottom of the drying chamber 1 generate hot air about 60-65° C. where this heat is partially recovered by heat exchanger 4 of the drying chamber 5 to heat up the inlet air 12 as an example. The discharge moist air 6 after being condensed 8, then filtered 9, may be recycled back to vertical stack 1 or 5 or vented depending on the quality of the air.

Figure 5:
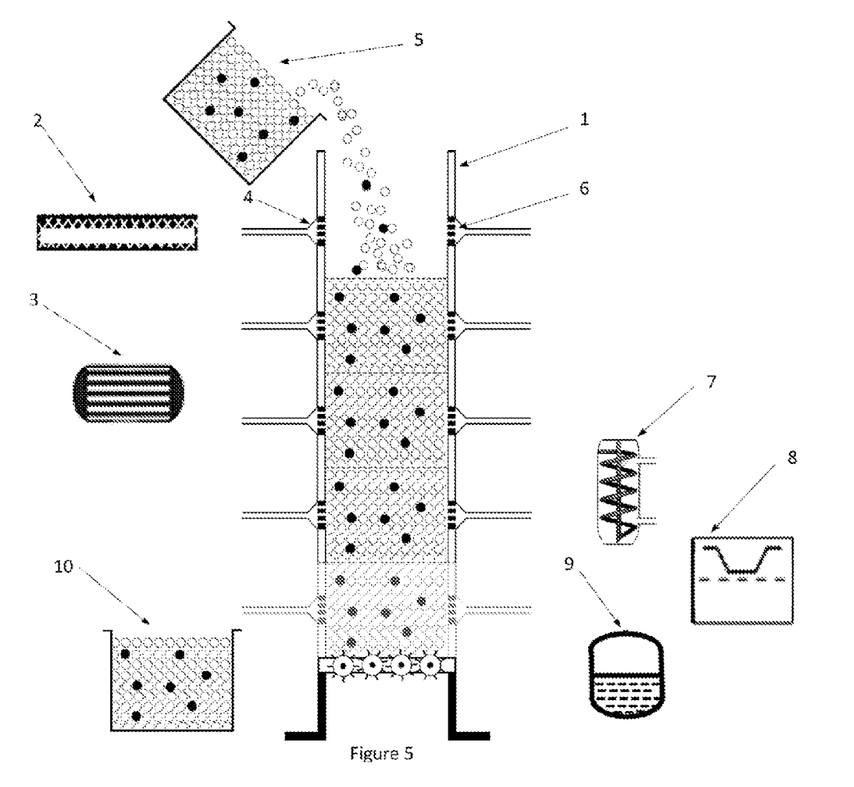
FIG. 5 is a schematic representation of the dryer, where the heat source is solar.
Figure 6:
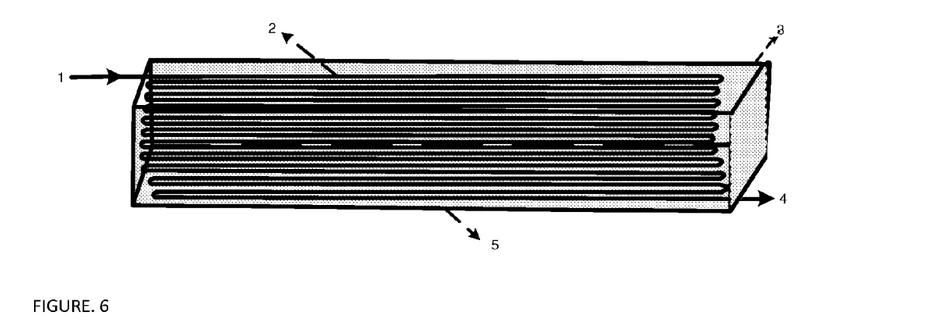
FIG. 6 shows a thin copper/aluminum tube enveloped in a Plexiglas for heating inlet air to be sent to the vertical stack for drying feedstock.
Figure 7:
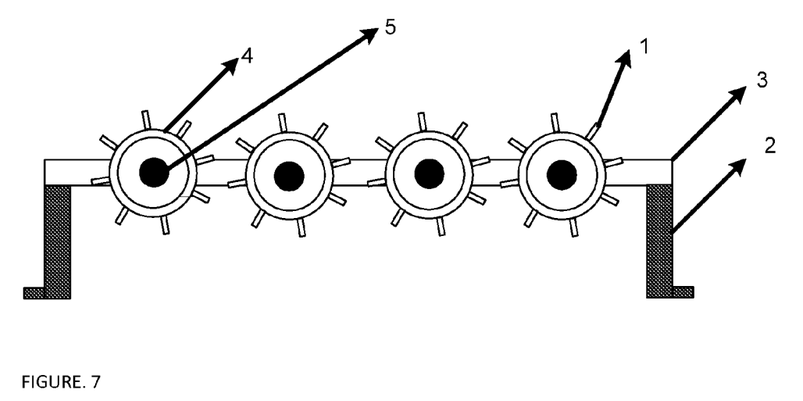
FIG. 7 shows the discharge system of the dryer consisting of vertical supports and a horizontal support and fin containing roller with shaft.
Figure 8:
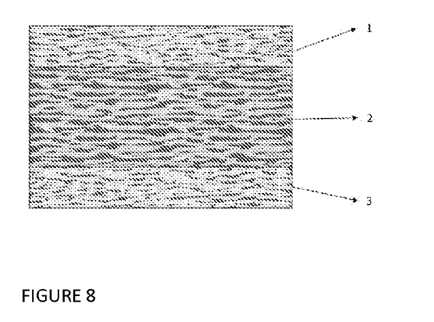
FIG. 8 shows cross-section of moisture-resistant biofilter for trapping particulates and hazardous gases.
Figure 11:
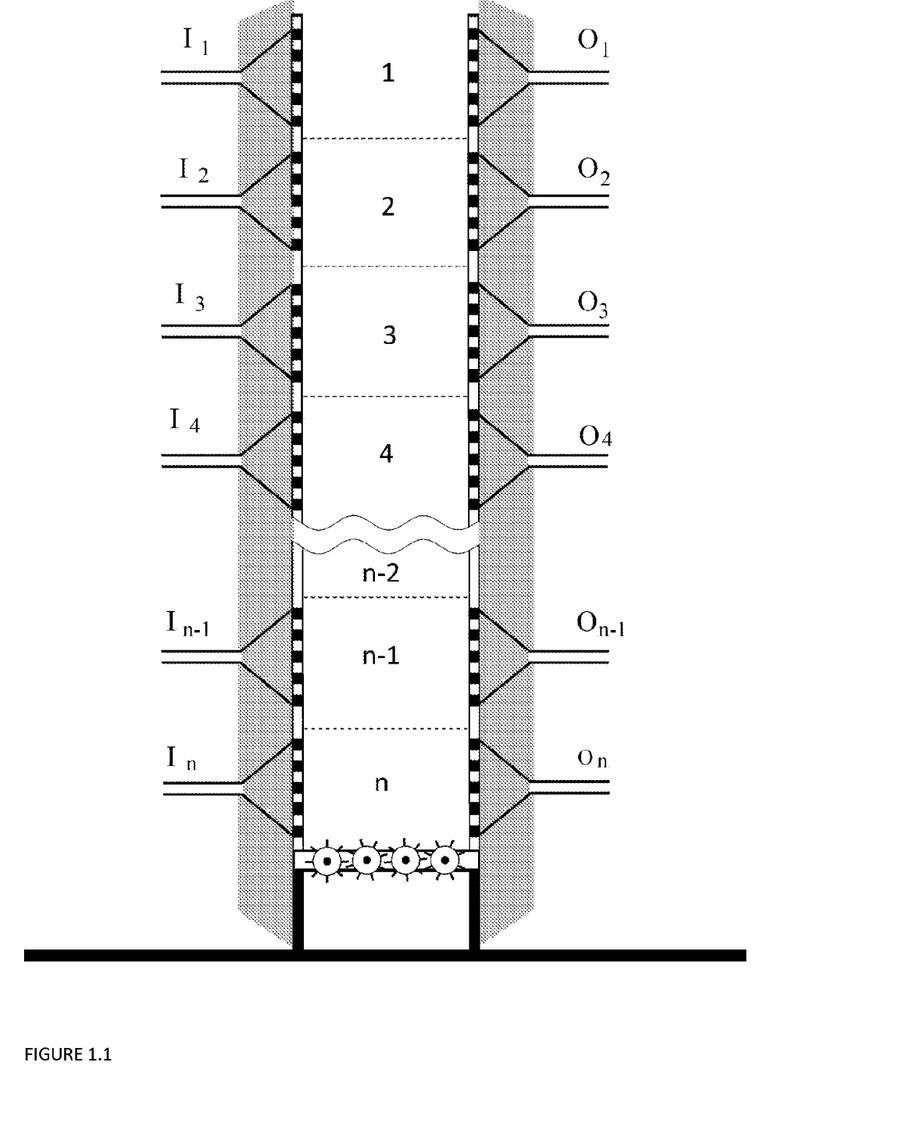
Figure 12:
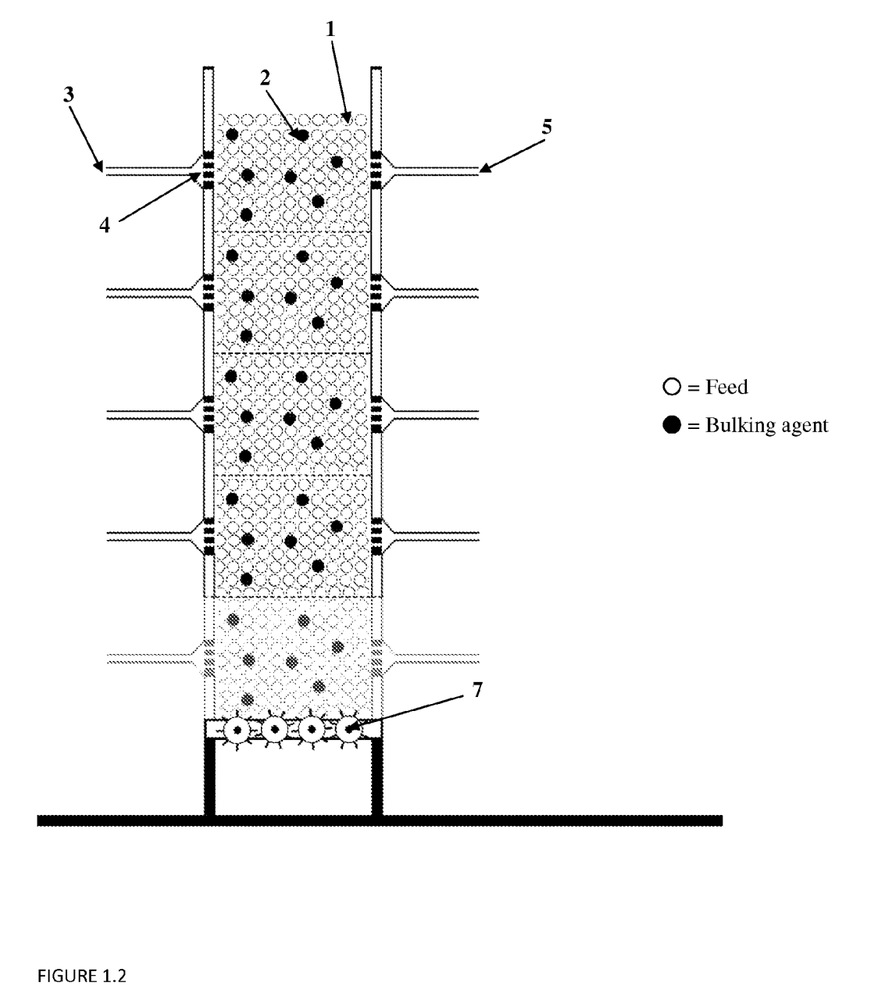
Figure 13:
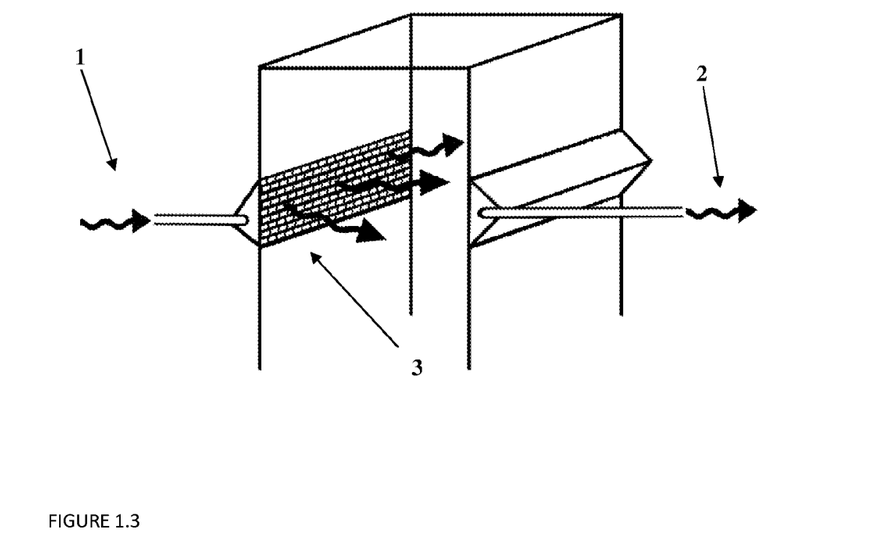
Figure 14:
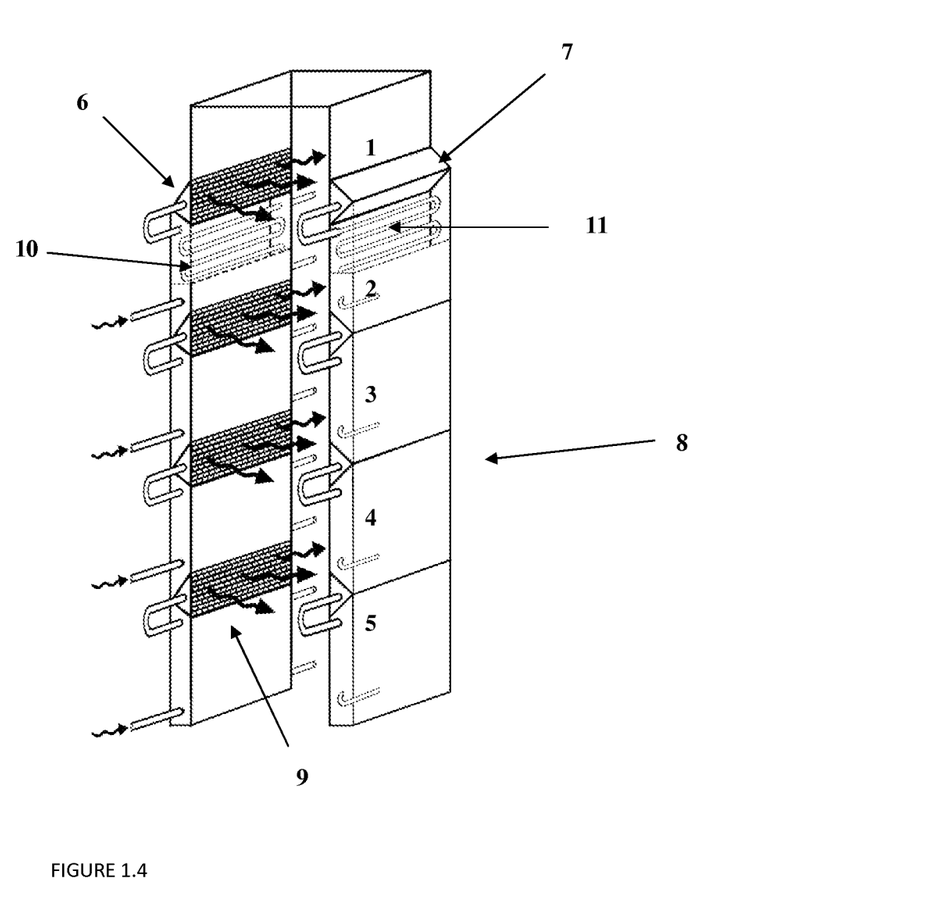

If the low grade heat source is solar heat 2, then the fresh air is heated within the range of 50-100° C., and is entered into the drying chamber after passing through a dehumidifier 3. The exhaust air 6 is treated using a condenser 7, biofilter 8, then the dry air vented. The feedstock is recirculated as shown in FIG. 5.

As the design suggests, black-coated highly conductive heat transfer pipes such as (but not limited to) copper pipes heated by sun, may heat the inlet air up to 100° C. Ambient air enters a matt black coated copper tube assembly 2 through port 1 and exits the tube through outlet port 4 (See FIG. 6). The tube assembly is attached to a blackened absorber plate 3 and housed in a transparent vessel—for example (but not limited to) Plexiglas 5. The sun's radiant energy will be collected in the vessel 5 and transferred into the highly conductive tube (for example but not limited to copper) for heating the air. The plate 3 is made of (but not limited to) aluminum to maximize energy absorption. Depending on ambient temperature and residence time of the air in chamber 3, the temperature of the air at the outlet port 4 could reach up to 100° C.

Figure 61:
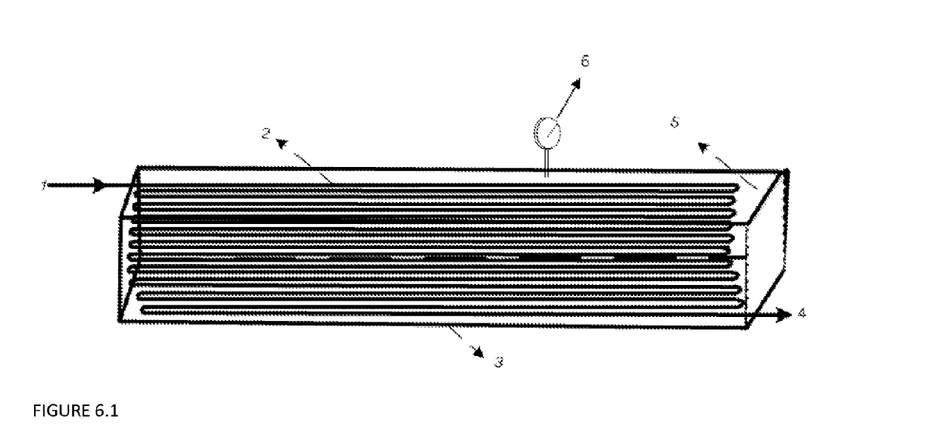

Ambient air enters a matt black coated high heat transfer tube such as (but not limited to) copper tube assembly 2 through port 1 and exits the tube through outlet port 4 (See FIG. 6.1). The tube assembly is housed in a vessel at least transparent at the top of (for example but not limited to) Plexiglas 3 filled with water 5. Depending on the temperature of water and residence time of the air in the vessel 3, the temperature of the air at the outlet port 4 could reach 90° C. The water in the chamber 3 on sunny days could be heated up to 80° C. The accumulated heat could be used during night for drying the feedstock. To minimize the heat loss, the chamber is insulated using for example but not limited to transparent double layer thermal insulation filled with vacuum or less conductive gas. To regulate the pressure inside the vessel a pressure gauge 6 is used. As an example, a vessel with 2000 L water at 70° C. could produce 6 kW power for 12 hours. This amount of power is enough to dry wood chips or biomass from 60% dry mass content to 80% dry mass content.

The discharge system of the apparatus (FIG. 7) consists of vertical supports 2, horizontal support 3 and fin 1 containing roller 4 with shaft 5. Two motors turn these rollers, allowing the dried feedstock to be discharged. Each roller consists of external pipe 4, internal shaft 5 and 8 fins, which provide the dryer with uniform discharge system. The fin sizing depends on feedstock characteristics and particle sizes.

The biofilter is a custom designed filter (FIG. 8: filter cross-section) to trap particulates and hazardous gases. The filter consists of but not limited to three layers, having top and bottom plies 1, 3 less open structure compared to the mid-ply 2. The top or bottom plies are made using paper forming process, but the mid-ply produced using foam forming process. The mid-ply is multi-layered structure indeed with a thickness in the range of 30-90 mm. The standard filter papers are thin single papers with basis weight of 60-100 g/m$^2$. Instead, the mid-ply is a multi-layered structure with plenty of capacity to absorb pollutant particles. The filter is made of decontaminated old cigarette butts combined with 0-10% of refined wood fibers and cross-linked with strength additives. The filter is water resistant using environmentally friendly strength additives including, but not limited to poly maleic acid and glutaraldehyde. The catalyst for wet strength including, but not limited to zinc nitrate and ammonium chloride. The dryer may need a single biofilter or many biofilters in combination depending on severity of odors or hazardous gases emitted by the feedstock.

Although the present invention described in a few preferred embodiments (FIGS. 1-8), workers skilled in the art will recognize that all these aspects are illustrative and not restrictive. So, within the scope of the appended claims the invention could be configured in other specific embodiments without departing from the spirit or essential characteristics of the invention. All changes in the preferred embodiments, which lie within the meaning and domain of the claims are therefore intended to be embraced therein.

THE FOLLOWING 3 NON-LIMITING EXAMPLES DESCRIBE THE CURRENT INVENTION

Example 1

Drying Wood Chips Using Low-Grade Heat Source

The dryer was used for drying wood chips at sizes about 3-4"×3-4"×¼" Initial feedstock moisture content was about 50%. Low-grade heat at about 65° C. was extracted through the heat extraction unit (heat exchanger in FIG. 3) from process water of about 85-90° C. and used in the dryer. Using a linear velocity of 6 cm/s the moisture content of the wood chips dropped to about 19% w/w in 10.5 hours residence time. The evaporated water (0.6 t/dry ton of the feedstock) was condensed in the condenser, and the dry air was recycled back into the dryer after being heated through heat exchanger.

Example 2

Drying Sorted Municipal Solid Waste Using Heat from Exothermic Reactions

Municipal solid waste is a major global concern; and composed of both organic and non-organic components. For this experiment, the feedstock was a waste at a moisture content of about 50%. The waste was divided into organic and non-organic parts. The organic part was about 40% w/w of the total flow at a moisture content of 70%. The non-organic part had lower moisture content (about 40%). Using a set up as shown in FIG. 4, the organic part was dried to a moisture level of about 45% in 30 hours using exothermic biological source, where it was ready to be composted at this level of moisture.

To use the dryer as a composter, the aeration rate was reduced. At about 9 days the feedstock has been converted into immature compost, then in a week time into a stable fertilizer. The released heat from the dryer (i.e., composter indeed), which was about 50° C. was used to dry the non-organic part from the moisture content of 40% to about 18% within 19 hours. The output was sent to be used as either power generation source by incineration or production of biofuel/electricity through gasification.

In another trial, the process low-grade heat, which was about 65° C. recycled back to the dryer causing the residence time of the non-organic part to be reduced to 15 hours.

Example 3

Drying of Pulp and Paper Sludge

A mixture of primary and secondary sludge (40/60 or 50/50 w/w %) was dried to moisture level of 45% in 56 hours using exothermic biological heat source in the dryer. The sludge at this dryness level could reduce fossil fuel consumption in boilers equivalent to the caloric value of the dried sludge. Around the same amount of clean water was collected for process or mill use through condenser. The heated dry air was recycled to the dryer. Similar trail has been conducted using low-grade heat source of 68° C. at the dryer. The residence time in the dryer was reduced to 32 hours.

Having described the invention, what is claimed is:

1. An apparatus for removing moisture from feedstock of 10% dry mass content up to 90% dry mass content using waste energy sources of temperature less than 100° C., comprising:

i. an upright drying chamber comprising a feedstock accepting port disposed at the upper end of the drying chamber and a feedstock discharging port disposed at lower end of the drying chamber, ii. a discharge system for discharging feedstock from the lower end of the drying chamber, when the moisture content of the feedstock reaches a desired quantity, iii. one or more inlet port/plenum for distribution of warm gasses passing through feedstock in the drying chamber, and one or more outlet port/plenum for discharging the exhaust gas out of the drying chamber, iv. a heat source for heating drying gas, wherein the heat source transfers heat to the drying air, v. a positive blower, which directs drying gas to the drying chamber and a negative blower which discharges exhaust gas out of the drying chamber, vi. means for dehumidifying the drying inlet air, vii. means for condensing the moist exhaust, and means for deactivating or annihilating harmful gases or particulates, and viii. means for accepting different feedstocks.

2. A drying chamber as claimed in claim 1 is an upright preferably rectangular cross-section perpendicular to its length, having modular structure in design with four vertical exterior walls, where one of the walls are adjustable.

3. A drying chamber as claimed in claim 2 comprising a plurality of zones arranged vertically one over another to form a vertically oriented stack-like chamber.

4. A plurality of zones as claimed in claim 3 consists of an upper margin and a lower margin, wherein each zone comprises:

i. at least one input perforated plate arranged between the upper and lower margins configured for transmitting input gases into the zone and through the feedstock, and ii. at least one output perforated plate disposed between the upper and lower margins and configured for transmitting output gases out of the zone.

5. A plurality of the zones as claimed in claim 4 consists of i. at least one perforated plate at the inlet air distribution port/plenum of each zone and parallel to the long axis of the drying chamber, and ii. at least one second perforated plate disposed parallel and in a distance less than 1.5 meter from the inlet air distribution port/plenum to transmit the input gas substantially along transverse axis direction of the drying chamber.

6. A drying chamber as claimed in claim 3 comprises an upright chamber preferably rectangular in cross section with four vertical walls forming first and second side walls and front and back walls, wherein i. one or more air distribution port/plenum to blow the drying air into the drying chamber through the perforated plates disposed on the first side wall, and one or more port/plenum to discharge the exhaust gases out of the drying chamber disposed on the second side wall parallel to the first side wall at a distance of preferably 1.5 meter from the first side wall.

7. A drying chamber as claimed in claim 6 comprises:

i. one or more heat exchangers disposed parallel to the long axes of the drying chamber on the first and second side walls of the drying chamber to recover the exhaust heat to be recycled back into the drying chamber through the inlet port/plenum of the first side wall.

8. A feedstock discharge system as claimed in claim 1 comprising four-roller type screws having 8 pins along the peripheral of each screw.

9. A method for removing moisture from a feedstock having moisture therein comprising the steps of i. mixing feedstock with bulking agent to preserve the feedstock permeability, ii. delivering the feedstock onto the upper end opening of the drying chamber, iii. providing the feedstock in a vertical disposition in said drying chamber, wherein the feedstock disposed within a plurality zones at a plurality of levels, iv. driving downwardly serially in succession the content of the zones along the long axis of the vertical drying chamber from the upper end of the drying chamber to the lower end of the drying chamber by said discharger, wherein gravity is a primary force in moving feedstock from the upper end zone downward toward a discharge level, v. discharging the feedstock such that the content of the last zone is removed, thereby causing the feedstock from the upper zones to move downward toward the discharge end.

vi. drying the feed by blowing the heated gas through transverse direction of the drying chamber as it moves downwardly in succession, vii. treating the exhaust air for harmful gases of the gas outlet port/plenum, and viii. recovering heat of the gases of the exhaust port/plenum of the drying chamber to be recycled back into the system.

10. A method as claimed in claim 9 comprising the further steps of i. mixing 0-70% fresh incoming feedstock with the discharge of the last zone, when the content of the last zone reaches to a desired level of moisture, ii. controlling residence time of the feed in each zone, wherein the residence time of feedstock in each zone estimated by dividing total residence time to the total number of zones of the drying chamber, and iii. configuring the dryer to work as a batch dryer by recirculation of the feedstock in succession without introducing fresh feedstock in the process till it reaches to a desired level of dryness.

11. A method as claimed in claim 9 including the further steps of introducing dehumidified and heated air uniformly at the same rate through the air distribution port/plenum to dry the feedstock as it moves downwardly in succession to the lower end of the drying chamber.

12. A method as claimed in claim 11 requires different steps if the heat source is from exothermic reactions, wherein the airflow rate should be reduced from the upper end to the lower end, in order to create a favorable condition for microorganisms activities.

13. A method as claimed in claim 11 to attain uniform feedstock dryness comprises further steps of i. swapping alternatively the positive and negative blowers to increase dryness uniformity, to reduce drying time, to promote uniform distribution of temperature gradient along the drying line, and consequently to bring about savings in drying energy, and ii. controlling airflow rate and swapping time through monitoring outlet relative humidity.

14. A method as claimed in claim 1 includes drying of non-organic fraction of waste by using heat generated from microbial activities of the organic fraction of the waste, wherein the exhaust heat of the organic fraction recovered by one or more heat exchangers to be used for drying the non-organic fraction of the waste.

15. An apparatus as claimed in claim 1 can work as composter by lowering the airflow rate downwardly from upper end zone to lower end zone of the drying chamber, returning the exhaust air for heating the organic feed, and controlling nutrient and moisture levels required for microorganisms growth.

16. An apparatus as claimed in claim 1 to produce at least one heat source to be used for drying organic or non-organic feedstock or to heat green houses comprises:

i. means for capturing heat from waste heat sources, ii. means for capturing and storing solar heat, iii. means for capturing heat generated by exothermic reactions, and iv. means to utilize one or more conventional primary heat sources when the said renewable sources to be used by the apparatus is unavailable.

17. An apparatus as claimed in claim 1, adapted and arranged such that the parameters of the input gases are controllable such that the operation of the apparatus is configurable to process many types of feedstocks.

* * * * *